(12) United States Patent
Sato et al.

(10) Patent No.: US 12,555,825 B2
(45) Date of Patent: Feb. 17, 2026

(54) NON-AQUEOUS ELECTROLYTE SECONDARY BATTERY

(71) Applicant: Panasonic Intellectual Property Management Co., Ltd., Osaka (JP)

(72) Inventors: Takao Sato, Kanagawa Ken (JP); Makoto Akutsu, Osaka Fu (JP); Yuko Ogawa, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 587 days.

(21) Appl. No.: 17/921,181

(22) PCT Filed: Feb. 25, 2021

(86) PCT No.: PCT/JP2021/007134
§ 371 (c)(1),
(2) Date: Oct. 25, 2022

(87) PCT Pub. No.: WO2021/220601
PCT Pub. Date: Nov. 4, 2021

(65) Prior Publication Data
US 2023/0170528 A1 Jun. 1, 2023

(30) Foreign Application Priority Data
Apr. 27, 2020 (JP) ................................ 2020-078610

(51) Int. Cl.
*H01M 10/0567* (2010.01)
*H01M 4/505* (2010.01)
*H01M 4/525* (2010.01)
*H01M 10/0568* (2010.01)
*H01M 4/02* (2006.01)
*H01M 10/0525* (2010.01)
*H01M 10/0569* (2010.01)

(52) U.S. Cl.
CPC ....... *H01M 10/0567* (2013.01); *H01M 4/505* (2013.01); *H01M 4/525* (2013.01); *H01M 10/0568* (2013.01); *H01M 2004/028* (2013.01); *H01M 10/0525* (2013.01); *H01M 10/0569* (2013.01); *H01M 2300/0025* (2013.01)

(58) Field of Classification Search
CPC ......... H01M 10/0567; H01M 10/0569; H01M 10/0568; H01M 2300/0025; H01M 2300/0037; H01M 2300/004; H01M 4/525; H01M 2004/028; H01M 10/0525; H01M 4/505
See application file for complete search history.

(56) References Cited

U.S. PATENT DOCUMENTS

| | | |
|---|---|---|
| 6,630,272 B1 | 10/2003 | Iwamoto et al. |
| 2003/0190530 A1 | 10/2003 | Yang et al. |
| 2012/0045697 A1 | 2/2012 | Park et al. |
| 2016/0272818 A1 | 9/2016 | Morris |
| 2018/0083321 A1 | 3/2018 | Hotta et al. |
| 2018/0108939 A1 | 4/2018 | Higuchi et al. |
| 2020/0365942 A1 | 11/2020 | Kobayashi et al. |
| 2021/0384555 A1 | 12/2021 | Kobayashi et al. |

FOREIGN PATENT DOCUMENTS

| | | |
|---|---|---|
| JP | 2001-110442 A | 4/2001 |
| JP | 2001-273927 A | 10/2001 |
| JP | 2012-229371 A | 11/2012 |
| JP | 2016-514770 A | 5/2016 |
| JP | 2018-45966 A | 3/2018 |
| JP | 2019-29184 A | 2/2019 |
| KR | 10-2015-0032138 A | 3/2015 |
| WO | 01/28027 A1 | 4/2001 |
| WO | 01/73884 A1 | 10/2001 |
| WO | 2016157735 A1 | 10/2016 |
| WO | 2019/105768 A1 | 6/2019 |

OTHER PUBLICATIONS

Extended Supplementary European Search Report dated Sep. 10, 2024, issued in counterpart Application No. 21796716.5. (8 pages).
Office Action dated Jan. 23, 2023, issued in counterpart IN application No. 202247066928. (5 pages).
International Search Report dated Apr. 27, 2021, issued in counterpart International Application No. PCT/JP2021/007134 (2 pages).
Office Action dated Mar. 28, 2025, issued in counterpart CN Applicatioin No. 202180031032.6, with partial English translation. (10 pages).

*Primary Examiner* — Laura Weiner
(74) *Attorney, Agent, or Firm* — WHDA, LLP

(57) ABSTRACT

A non-aqueous electrolyte secondary battery includes a positive electrode including a positive electrode active material, a separator, a negative electrode facing the positive electrode with the separator interposed therebetween, and a non-aqueous liquid electrolyte, wherein the non-aqueous liquid electrolyte includes a non-aqueous solvent, and 6-alkylthio-1,3,5-triazine-2,4-dithiol; at least a portion of the 6-alkylthio-1,3,5-triazine-2,4-dithiol is dissolved in the non-aqueous solvent; and the alkylthio group at a 6th position preferably has an alkyl group with 1 to 8 carbon atoms.

3 Claims, 1 Drawing Sheet

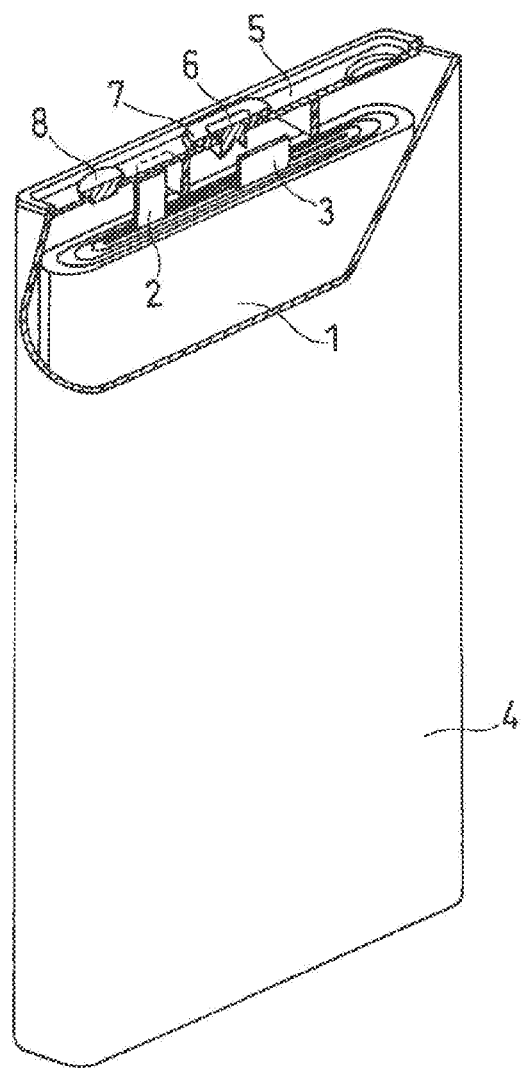

NON-AQUEOUS ELECTROLYTE SECONDARY BATTERY

CROSS-REFERENCE TO RELATED APPLICATIONS

This application is a National Phase Application filed under 35 U.S.C. § 371 of International Application No. PCT/JP2021/007134 filed on Feb. 25, 2021 which claims the benefit of priority under 35 U.S.C. § 119(a) of Japanese Patent Application No. 2020-078610 filed in Japan on Apr. 27, 2020, the contents of which are incorporated herein by reference.

TECHNICAL FIELD

The present disclosure relates to a non-aqueous electrolyte secondary battery.

BACKGROUND ART

Non-aqueous electrolyte secondary batteries represented by lithium ion secondary batteries include a positive electrode, a negative electrode, and a non-aqueous electrolyte. To ensure excellent characteristics of non-aqueous electrolyte secondary batteries, attempts have been made to improve battery constituents.

In non-aqueous electrolyte secondary batteries in which electrochemical redox reactions are used, presence of metals such as copper and iron causes metal reaction to dissolve and deposit, and as a result, reduces battery voltages.

Meanwhile, in the field of metal surface treatment, it has been known that a coating including a metal complexing agent can suppress the metal dissolution and deposition. The composition proposed by Patent Literature 1 to be applied to metal substrates includes a metal cation, a metal complexing agent, and an aqueous carrier, and the substrate is processed by a method including a step of applying the composition to the substrate, a step of forming a chemical coating by drying the composition, and a step of applying a coating on the chemical coating.

Patent Literature 2 has proposed a lithium secondary battery, including an electrode group formed by winding or stacking a positive electrode plate and a negative electrode plate, with a separator interposed therebetween, and a non-aqueous liquid electrolyte including a lithium compound as the electrolyte, wherein an organic and/or inorganic Cu corrosion inhibitor, or an organic and/or inorganic Cu scavenger which is an inhibitor is added to at least one of the positive electrode plate, the negative electrode plate, the separator, and the non-aqueous liquid electrolyte.

Patent Literature 3 has proposed a liquid electrolyte for a non-aqueous electrochemical device having at least two electrodes, a non-aqueous liquid electrolyte in which a solute is dissolved in a non-aqueous solvent, and a separator interposed between the two electrodes, wherein the non-aqueous liquid electrolyte contains at least 6-substituted-1, 3,5-triazine-2,4-dithiol and a derivative thereof. According to Patent Literature 3, the 6-substituted-1,3,5-triazine-2,4-dithiol is a coating known as an organic plating, and conventionally used for imparting release properties for molds, direct adhesion between metals and polymers, and metal corrosion prevention techniques.

CITATION LIST

Patent Literature

PLT1: Japanese Translation of PCT International Application Publication No. 2016-514770

PLT2: Japanese Laid-Open Patent Publication No. 2001-273927

PLT3: Japanese Laid-Open Patent Publication No. 2001-110442

SUMMARY OF INVENTION

The complexing agent used in the field of metal surface treatment reacts with non-aqueous electrolytes, or causes redox reactions at the electrode surface, and therefore is difficult to use.

An aspect of the present disclosure relates to a non-aqueous liquid electrolyte for a non-aqueous electrolyte secondary battery including a non-aqueous solvent, and 6-alkylthio-1,3,5-triazine-2,4-dithiol represented by a general formula:

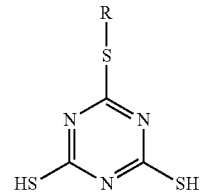

[Chemical formula 1]

wherein R is an alkyl group, and at least a portion of the 6-alkylthio-1,3,5-triazine-2,4-dithiol is dissolved in the non-aqueous solvent.

Another aspect of the present disclosure relates to a non-aqueous electrolyte secondary battery including: a positive electrode, a separator, a negative electrode facing the positive electrode with the separator interposed therebetween, and a non-aqueous liquid electrolyte, wherein the non-aqueous liquid electrolyte includes a non-aqueous solvent, and 6-alkylthio-1,3,5-triazine-2,4-dithiol represented by a general formula:

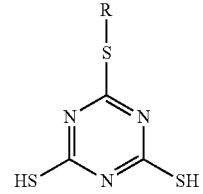

[Chemical formula 2]

wherein R is an alkyl group, and at least a portion of the 6-alkylthio-1,3,5-triazine-2,4-dithiol is dissolved in the non-aqueous solvent.

The present disclosure can suppress reduction in voltage in non-aqueous electrolyte secondary batteries.

BRIEF DESCRIPTION OF DRAWINGS

FIG. 1 is a schematic oblique view of a partially cutaway non-aqueous electrolyte secondary battery in an embodiment of the present disclosure.

DESCRIPTION OF EMBODIMENTS

A non-aqueous liquid electrolyte for a non-aqueous electrolyte secondary battery of the present disclosure includes a non-aqueous solvent, and 6-alkylthio-1,3,5-triazine-2,4- dithiol (hereinafter, referred to as triazine dithiol derivative RS) represented by a general formula:

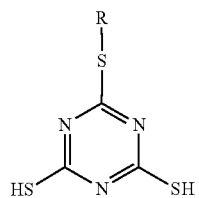

[Chemical formula 3]

Where R is an alkyl group and at least a portion of the 6-alkylthio-1,3,5-triazine-2,4-dithiol is dissolved in the non-aqueous solvent. The present disclosure further relates to a non-aqueous electrolyte secondary battery including a positive electrode, a separator, a negative electrode facing the positive electrode with the separator interposed therebetween, and the above-described non-aqueous liquid electrolyte.

The non-aqueous liquid electrolyte is not limited to a liquid type non-aqueous electrolyte, and may be in a form of a gel electrolyte or a solid electrolyte having no flowability, forming a composite with a gelation agent or a matrix material. The non-aqueous electrolyte includes non-aqueous liquid electrolytes, gel electrolytes, and solid electrolytes, and excludes an aqueous solution electrolyte.

The triazine dithiol derivative RS may form a coating on a metal surface, or form a complex with metal ions. The two thiol groups (SH group) directly bonded to the carbon atom of the triazine ring contribute to reactions at a metal surface or with metal ions. Meanwhile, the alkylthio group at a 6th position (R—S group) contributes to functionality of the coating. For example, the alkylthio group at the 6th position suppresses excessively generated precipitation from coagulation of the complex when the triazine dithiol derivative RS forms a complex with metal ions. Furthermore, the alkylthio group at the 6th position is considered to have effects of suppressing decomposition of the triazine dithiol derivative RS in the battery. Compared with conventional triazine dithiol derivatives having an alkyl amino group at the 6th position, the triazine dithiol derivative RS is highly soluble to the non-aqueous solvent (especially carbonate esters) used in non-aqueous liquid electrolytes, and has excellent affinity with non-aqueous liquid electrolytes.

When impurity metals are included in batteries, metal ions may be dissolved into the non-aqueous liquid electrolyte from the impurity metal exposed to the positive electrode potential. Furthermore, from the positive electrode active material included in the positive electrode, the transition metal may be dissolved into the non-aqueous liquid electrolyte. The metal ion in the non-aqueous liquid electrolyte deposits at the negative electrode surface. The reactions of metal dissolution and deposition decreases the battery voltage.

The triazine dithiol derivative RS included in the non-aqueous liquid electrolyte has a characteristic to form a coating on the metal surface, and therefore dissolution of the metal ion into the non-aqueous liquid electrolyte is suppressed. Furthermore, the triazine dithiol derivative RS has a characteristic to form a complex with metal ions, and therefore the metal ion dissolved into the non-aqueous liquid electrolyte forms a complex and their free mobility is limited. By suppressing dissolution of metal ions and forming a complex with metal ions, the metal deposition is significantly suppressed. Therefore, when the battery is contaminated with metals of impurity, or even when transition metal ions are easily dissolved from the positive electrode active material, reduction in the battery voltage is suppressed.

In the alkylthio group at the 6th position (R—S group) of the triazine dithiol derivative RS, the alkyl group (R group) may have a number of carbon atoms of, for example, 1 to 8. By setting the number of carbon atoms of the alkyl group to 8 or less, diffusivity of the triazine dithiol derivative RS improves, and the metal surface or the positive electrode active material surface is easily covered. In particular, in view of availability of the triazine dithiol derivative RS, the alkyl group (R group) preferably has a number of carbon atoms of 1 to 4. Specific examples of the alkylthio group include a methylthio group and a butylthio group.

In the non-aqueous liquid electrolyte, the triazine dithiol derivative RS content is, for example, 0.001 mass % or more and 5 mass % or less, 0.01 mass % or more and 5 mass % or less, 0.01 mass % or more and 3 mass % or less, or 0.1 mass % or more and 1.5 mass % or less. When using the triazine dithiol derivative RS in an amount within the above-described range, the metal deposition or battery voltage reduction can be significantly suppressed.

In the battery, the triazine dithiol derivative RS is used for forming a coating by being attached to the surface of metal such as electrode current collectors or a positive electrode active material surface. Therefore, when analyzing the non-aqueous liquid electrolyte taken out from the inside battery, the triazine dithiol derivative RS content may be less than 0.01 mass %. Meanwhile, the triazine dithiol derivative RS is rarely completely consumed. In view of achieving effects of the present disclosure, the non-aqueous liquid electrolyte taken out from the battery may contain the triazine dithiol derivative RS of a detection limit or more (e.g., 0.0001 mass % or more).

The non-aqueous liquid electrolyte includes, along with the non-aqueous solvent and the electrolytic salt dissolved in the non-aqueous solvent, a triazine dithiol derivative RS. The triazine dithiol derivative RS is used as an additive, not as a main component of the non-aqueous liquid electrolyte. The additive means a component other than the electrolytic salt, having a content in the non-aqueous liquid electrolyte of, for example, 20 mass % or less (or 10 mass % or less (especially 5 mass % or less)).

The non-aqueous liquid electrolyte may further include, as an additive, vinyl ethylene carbonate (VEC), vinylene carbonate (VC), and fluoroethylene carbonate (FEC). In particular, VC forms a thin coating on the negative electrode surface, and suppresses decomposition of the non-aqueous solvent and deposition of metal.

The non-aqueous liquid electrolyte may further include, as an additive, an oxalate complex salt. Examples of the oxalate complex salt include, in view of excellent compatibility with the non-aqueous liquid electrolyte, a salt of an oxalate complex anion and lithium ions. The oxalate complex anion is preferably bis oxalate borate anion (BOB anion), and difluoro oxalateborate anion (FOB anion), and in particular, lithium bis oxalateborate (LiBOB) forms a thin and relatively stable coating at a high temperature on the negative electrode surface, and suppresses decomposition of the non-aqueous solvent and metal deposition.

The content of the components in the non-aqueous liquid electrolyte is determined, for example, by using a high performance liquid chromatography.

In the following, elements of the non-aqueous electrolyte secondary battery of the present disclosure are described in detail.

(Positive Electrode)

The positive electrode includes a positive electrode active material. The positive electrode generally includes a positive electrode current collector, and a positive electrode mixture supported on the positive electrode current collector. The positive electrode includes, generally, a layered positive electrode mixture (hereinafter, referred to as positive electrode mixture layer) supported on the positive electrode current collector. The positive electrode mixture layer can be formed by applying a positive electrode slurry in which the elements of the positive electrode mixture are dispersed in a dispersion medium on a surface of the positive electrode current collector, and drying the slurry. The dried coating film may be rolled, if necessary. The positive electrode mixture layer may be formed on one surface of the positive electrode current collector, or may be formed on both surfaces thereof.

The positive electrode mixture may contain the positive electrode active material as an essential component, and may contain a binder, a thickener, and a conductive agent as optional components.

For the positive electrode active material, for example, a lithium transition metal composite oxide having a layered rock salt type structure is used. In particular, a lithium transition metal composite oxide including Ni, Co, and at least one of Al and Mn (hereinafter, also referred to as composite oxide NC) is promising because it can bring out a high capacity and a high voltage. With the composite oxide NC having a high Ni content, it is advantageous in terms of costs, and a higher capacity can be ensured. However, with a high Ni content, the composite oxide NC has unstable crystal structure, and a transition metal such as Ni tends to dissolve easily. Furthermore, when Ni is dissolved from the composite oxide NC with a high Ni content, a nickel oxide (NiO) layer is formed on the particle surface, and may cause an increase in the resistance of the positive electrode. Meanwhile, the triazine dithiol derivative RS forms a coating by being adsorbed to the composite oxide NC surface, and effects of suppressing dissolution of the transition metal (especially Ni) can be expected.

The composite oxide NC has a composition represented by, for example, $Li_\alpha Ni_{(1-x1-x2-x3-y)}Co_{x1}Mn_{x2}Al_{x3}M_y O_{2+\beta}$ ($0.95 \leq \alpha \leq 1.05$, $0.5 \leq 1-x1-x2-x3-y \leq 0.95$, $0 < x1 \leq 0.4$, $0 \leq x2 \leq 0.2$, $0 \leq x3 \leq 0.2$, $0 < x2+x3 \leq 0.4$, $0 \leq y \leq 0.1$, $-0.05 \leq \beta \leq 0.05$), without limitation. However, M is at least one selected from the group consisting of Ti, Zr, Nb, Mo, W, Fe, Zn, B, Si, Mg, Ca, Sr, and Y.

($1-x1-x2-x3-z$) representing the ratio of Ni (atomic ratio) preferably satisfy $0.8 \leq 1-x1-x2-x3-z \leq 0.95$ in view of a higher capacity, and more preferably $0.9 \leq 1-x1-x2-x3-z \leq 0.95$.

X1 representing the Co ratio (atomic ratio) may be larger than 0 and 0.04 or less, preferably 0.02 or less, more preferably 0.015 or less.

X2 representing the Mn ratio (atomic ratio) may be $0 \leq x2 \leq 0.1$, preferably $0 < x2 \leq 0.1$. The composite oxide NC including Mn is relatively reasonable and has a high capacity.

X3 representing the Al ratio (atomic ratio) may be $0 \leq x3 \leq 0.1$, preferably $0.03 \leq x3 \leq 0.1$, and can be $0.05 \leq x3 \leq 0.1$. The composite oxide NC including Al stabilizes the crystal structure, and easily ensures excellent cycle characteristics.

The element M included in the composite oxide NC is preferably at least one selected from the group consisting of Nb, Sr, and Ca, and it is considered that the surface structure of the composite oxide NC is stabilized, and the metal dissolution is easily suppressed. In the composite oxide NC particles, Nb, Sr, and Ca that are unevenly distributed near the particle surface are more effective. Y representing the element M ratio is 0 or more and 0.1 or less, or may be 0 or more and 0.05 or less.

The content of the elements composing the composite oxide NC can be determined by an inductively coupled plasma atomic emission spectroscopy (ICP-AES), electron probe micro analyzer (EPMA), or energy dispersive X-ray spectroscopy (EDX).

The composite oxide NC is, for example, secondary particles of a plurality of primary particles coagulated. The primary particles have a particle size of, generally, 0.05 μm or more and 1 μm or less. The composite oxide has an average particle size of, for example, 3 μm or more and 30 μm or less, or may be 5 μm or more and 25 μm or less.

In this specification, the average particle size means a particle size (volume average particle size) having a volume integrated value of 50% in the particle size distribution measured by the laser diffraction scattering method. Such an average particle size may be referred to as D50. For example, "LA-750" manufactured by Horiba Corporation can be used as the measuring device.

The positive electrode active material may include a lithium transition metal composite oxide other than the composite oxide NC, but preferably, the composite oxide NC ratio is large. The composite oxide NC ratio in the positive electrode active material is, for example, 90 mass % or more, or 95 mass % or more. The composite oxide NC ratio in the positive electrode active material is 100 mass % or less. The positive electrode active material may be composed only of the composite oxide NC.

For the binder, for example, a resin material is used. Examples of the binder include fluorine resin (e.g., polytetrafluoroethylene, polyvinylidene fluoride), polyolefin resin (e.g., polyethylene, polypropylene), polyamide resin (e.g., aramid resin), polyimide resin (e.g., polyimide, polyamideimide), acrylic resin (e.g., polyacrylic acid, poly methacrylic acid, acrylic acid-methacrylic acid copolymer, ethylene-acrylic acid copolymer, or a salt thereof), vinyl resin (e.g., polyvinyl acetate), and rubber materials (e.g., styrene-butadiene copolymer rubber (SBR)). A kind of binder may be used singly, or two or more kinds thereof may be used in combination.

Examples of the thickener include cellulose derivatives such as cellulose ether. Examples of the cellulose derivative include CMC and derivatives thereof, and methyl cellulose. The CMC derivatives include also CMC salts. Examples of the salts include alkali metal salt (e.g., sodium salt), and ammonium salt. A kind of thickener may be used singly, or two or more kinds thereof may be used in combination.

Examples of the conductive agent include electrically conductive fiber and electrically conductive particles. Examples of the electrically conductive fiber include carbon fiber, carbon nanotube, and metal fiber. Examples of the electrically conductive particles include electrically conductive carbon (carbon black, graphite, etc.), and metal powder. A kind of conductive agent may be used singly, or two or more kinds thereof may be used in combination.

The dispersion medium used for the positive electrode slurry is not particularly limited, and for example, water, alcohol (e.g., ethanol), ether (e.g., tetrahydrofuran), amide (e.g., dimethylformamide), N-methyl-2-pyrrolidone (NMP), or a solvent mixture thereof is used.

The positive electrode current collector is selected in accordance with the type of the non-aqueous electrolyte secondary battery. Examples of the positive electrode current collector include a sheet type one. Examples of the current collector include metal foil. Examples of the material of the positive electrode current collector may be, for example, stainless steel, aluminum, aluminum alloy, titanium, or the like.

The thickness of the positive electrode current collector is not particularly limited, but is, for example, 1 to 50 µm, or 5 to 30 µm.

(Negative Electrode)

The negative electrode includes a negative electrode active material. The negative electrode generally includes a negative electrode mixture including a negative electrode active material and a negative electrode current collector that supports the negative electrode mixture. The negative electrode generally includes a layered negative electrode mixture (hereinafter, referred to as negative electrode mixture layer). The negative electrode mixture may further include at least one selected from the group consisting of a binder, a thickener, and a conductive agent.

For the negative electrode active material, a metal lithium, or a lithium alloy may be used, but a material that is capable of electrochemically storing and releasing lithium ions is suitably used. Examples of such a material include a carbon material, a Si-containing material, and a Sn-containing material. The negative electrode may include one type of negative electrode active material, or two or more types can be used in combination. Preferably, of the negative electrode active materials, a carbon material and a Si-containing material are used. The carbon material and the Si-containing material can be used in combination.

Examples of the carbon material include graphite, graphitizable carbon (soft carbon), and non-graphitizable carbon (hard carbon). A kind of carbon material may be used singly, or two or more kinds thereof may be used in combination.

The carbon material is preferably graphite, because it has excellent charge/discharge stability, and has a small irreversible capacity. Examples of the graphite include natural graphite, artificial graphite, graphitized mesophase carbon particles, and the like. The graphite particles may partially include amorphous carbon, graphitizable carbon, or non-graphitizable carbon.

Graphite is a carbon material in which a graphite type crystal structure is developed. The plane spacing d002 between the (002) planes of the graphite measured by X-ray diffractometry may be, for example, 0.340 nm or less, or 0.3354 nm or more and 0.340 nm or less. The crystallite size Lc (002) of the graphite may be, for example, 5 nm or more, or 5 µm or more and 200 nm or less. The crystallite size Lc (002) is measured by, for example, the Scherrer method. When the plane spacing d002 and the crystallite size Lc (002) of the (002) planes of the graphite fall within die above ranges, a high capacity can be easily obtained.

Examples of the Si-containing material include elemental Si, a silicon alloy, and a silicon compound (silicon oxide, silicate, etc.). Examples of the silicon oxide include $SiO_x$ particles. X is, for example $0.5 \leq x < 2$, or may be $0.8 \leq x \leq 1.6$. A kind of Si-containing material may be used singly, or two or more kinds thereof may be used in combination. The Si-containing material may be, for example, a material in a particle state. The Si-containing material has an average particle size (D50) of, for example, 1 µm or more and 25 µm or less, or may be 4 pun or more and 15 µm or less.

Examples of the binder include those resin materials exemplified for the positive electrode. The conductive agent can be selected, for example, from those exemplified for the positive electrode. The shape and the thickness of the negative electrode current collector can be selected from those shapes and ranges explained for the positive electrode current collector. For the material of the negative electrode current collector, stainless steel, nickel, nickel alloy, copper, copper alloy can be exemplified. The dispersion medium used for the negative electrode slurry can be selected from those exemplified for, for example, the positive electrode.

(Non-Aqueous Liquid Electrolyte)

Examples of the non-aqueous solvent composing the non-aqueous liquid electrolyte include cyclic carbonate, chain carbonate, cyclic carboxylate, and chain carboxylate. Examples of the cyclic carbonate include propylene carbonate (PC), ethylene carbonate (EC), and the like. Examples of the chain carbonate include diethyl carbonate (DEC), ethyl methyl carbonate (EMC), dimethyl carbonate (DMC), and the like. Examples of the cyclic carboxylate include γ-butyrolactone (GBL) and γ-valerolactone (GVL). Examples of the chain carboxylate include methyl formate, ethyl formate, propyl formate, methyl acetate (MA), ethyl acetate, propyl acetate, methyl propionate, ethyl propionate, and propyl propionate. The non-aqueous electrolyte may include one type of the non-aqueous solvent, or two or more types may be used in combination.

Examples of the electrolytic salt or additive composing the non-aqueous liquid electrolyte include $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiBioClio$, lithium lower aliphatic carboxylate, LiCl, LiBr, LiI, boric acid salt, and imide salt. Examples of the boric acid salt include bis(1,2-benzene diolate (2-)-O,O') lithium borate, bis(2,3-naphthalene diolate (2-)-O,O') lithium borate, bis(2,2'-biphenyl diolate (2-)-O,O') lithium borate, and bis(5-fluoro-2-olate-1-benzene sulfonic acid-O, O') lithium borate. Examples of the imide salt include bis fluoro sulfonyl imide lithium ($LiN(FSO_2)_2$), bis trifluoro methane sulfonic acid imide lithium ($LiN(CF_3SO_2)_2$), trifluoro methane sulfonic acid nonafluoro butane sulfonic acid imide lithium ($LiN(CF_3SO_2)(C_4F_9SO_2)$), and bis pentafluoro ethane sulfonic acid imide lithium ($LiN(C_2F_5SO_2)_2$). The non-aqueous electrolyte may include one type of lithium salt, or two or more types thereof may be used in combination.

The electrolytic salt concentration in the non-aqueous liquid electrolyte is, for example, 0.5 mol/L or more and 2 mol/L or less.

(Separator)

Usually, it is desirable to interpose a separator between the positive electrode and the negative electrode. The separator has excellent ion permeability and suitable mechanical strength and electrically insulating properties. The separator may be, for example, a microporous thin film, a woven fabric, or a nonwoven fabric, or at least two laminates selected from these can be used. Preferably, the separator material is polyolefin (e.g., polypropylene, polyethylene).

(Others)

In an example structure of the non-aqueous electrolyte secondary battery, an electrode group and a non-aqueous electrolyte are accommodated in an outer package, and the electrode group has a positive electrode and a negative electrode wound with a separator interposed therebetween. Alternatively, instead of the wound-type electrode group, other forms of electrode groups may be applied, such as a laminated electrode group in which the positive electrode and the negative electrode are laminated with a separator interposed therebetween. The non-aqueous electrolyte secondary battery may be any shape of, for example, a cylindrical shape, a rectangular shape, a coin-shape, a button shape, or a laminate shape.

In the following, a structure of a rectangular non-aqueous electrolyte secondary battery is described as an example of the non-aqueous electrolyte secondary battery of the present disclosure with reference to FIG. 1. FIG. 1 is a schematic oblique view of a partially cutaway non-aqueous electrolyte secondary battery of an embodiment of the present disclosure.

The battery includes a bottomed rectangular battery case 4, and an electrode group 1 and a non-aqueous electrolyte accommodated in the battery case 4. The electrode group 1 has a negative electrode in the form of a long strip, a positive electrode in the form of a long strip, and a separator interposed therebetween for preventing direct contact therebetween. The electrode group 1 is formed by winding the negative electrode, the positive electrode, and the separator around a flat core and removing the core.

One end of the negative electrode lead 3 is attached to the negative electrode current collector of the negative electrode by welding or the like. The other end of the negative electrode lead 3 is electrically connected to the negative electrode terminal 6 provided in a sealing plate 5 with a resin-made insulating plate. The negative electrode terminal 6 is insulated from the sealing plate 5 by a resin gasket 7. One end of the positive electrode lead 2 is attached to the positive electrode current collector of the positive electrode by welding or the like. The other end of the positive electrode lead 2 is connected to the back surface of the sealing plate 5 with an insulating plate. That is, the positive electrode lead 2 is electrically connected to the battery case 4 which also serves as the positive electrode terminal. The insulating plate separates the electrode group 1 and the sealing plate 5 and separates the negative electrode lead 3 and the battery case 4. The periphery of the sealing plate 5 is fitted to the open end of the battery case 4, and the fitting portion is laser welded. In this manner, the opening of the battery case 4 is sealed by the sealing plate 5. The injection hole for the liquid electrolyte provided in the sealing plate 5 is plugged with a sealing plug 8.

EXAMPLES

In the following, the present disclosure will be described in detail based on Examples and Comparative Examples, but the present invention is not limited to Examples below.

Examples 1 to 12, Reference Examples 1 to 2 and Comparative Examples 1 to 4

A non-aqueous electrolyte secondary battery was made and evaluated as below.

(1) Production of Positive Electrode 100 parts by mass of the positive electrode active material particles shown in Table 1, 1 part by mass of acetylene black, 1 part by mass of polyvinylidene fluoride, and a suitable amount of NMP were mixed, thereby producing a positive electrode slurry. Next, the positive electrode slurry was applied to one surface of the aluminum foil, the coating was dried and then rolled to form a positive electrode mixture layer (thickness 95 μm, density 3.6 g/cm$^3$) on both surfaces of the aluminum foil, thereby producing a positive electrode.

The composition of the positive electrode active material shown in Table 1 is shown below.

LNCM: $LiNi_{0.35}Co_{0.35}Mn_{0.30}O_2$
LNCA: $LiNi_{0.88}Co_{0.09}Al_{0.03}O_2$ (2) Production of Negative Electrode 98 parts by mass of the negative electrode active material (graphite), 1 part by mass of sodium salt (CMC-Na) of carboxymethyl cellulose, and 1 part by mass of SBR, and a suitable amount of water were mixed, thereby preparing a negative electrode slurry. Next, the negative electrode slurry was applied to one side of copper foil, which was the negative electrode current collector, and the coating was dried and then rolled to form negative electrode mixture layers on both surfaces of the copper foil.

(3) Preparation of Non-Aqueous Liquid Electrolyte

To a solvent mixture (EC:EMC=3:7 (volume ratio)) of EC and EMC, $LiPF_6$ and 6-methylthio-1,3,5-triazine-2,4-dithiol as a triazine dithiol derivative RS (shown in Table 1 as RS) were dissolved, thereby preparing a non-aqueous liquid electrolyte. The non-aqueous liquid electrolyte had a $LiPF_6$ concentration of 1.0 mol/L. The prepared non-aqueous liquid electrolyte had a 6-methylthio-1,3,5-triazine-2,4-dithiol concentration (initial concentration) of a value (mass %) shown in Table 1.

(4) Preparation of Non-Aqueous Electrolyte Secondary Battery

The positive electrode was cut into a predetermined shape to obtain a positive electrode for evaluation. The positive electrode had a region of 20 mm×20 mm that works as the positive electrode, and a connection region of 5 mm×5 mm for connection with a tab lead. Thereafter, the positive electrode mixture layer formed on the above-described connecting region was scraped to expose the positive electrode current collector. Afterwards, the exposed portion of the positive electrode current collector was connected to the positive electrode tab lead and a predetermined region of the outer periphery of the positive electrode tab lead was covered with an insulating tab film. For Examples 1 to 12 and Comparative Examples 1 to 4, metal powder of the element shown in Table 1 of about a diameter of 100 μm was embedded at about a center of the positive electrode mixture layer intentionally.

The negative electrode was cut into the same form as the positive electrode, and a negative electrode for evaluation was obtained. The negative electrode mixture layer formed on the connection region similarly to the positive electrode was peeled off to expose the negative electrode current collector. Afterwards, the exposed portion of the negative electrode current collector was connected to the negative electrode tab lead in the same manner as the positive electrode, and a predetermined region of the outer periphery of the negative electrode tab lead was covered with an insulating tab film.

A cell was produced using the positive electrode and negative electrode for evaluation. First, the positive electrode and negative electrode were allowed to face each other with a polypropylene made separator (thickness 30 μm) so that the positive electrode mixture layer overlaps with the negative electrode mixture layer, thereby producing an electrode group. Next, an Al laminate film (thickness 100 pun) cut into a size of 60×90 mm rectangle was folded into half, and the long side end of 60 mm was heat sealed at 230° C., to make it into an envelope of 60×45 mm. Afterwards, the produced electrode group was put into the envelope, and the end face of the Al laminate film and position of the heat fused resin of the tab lead were aligned and heat sealed at 230° C. Next, 0.3 cm$^3$ of the non-aqueous liquid electrolyte was injected from the not heat-sealed portion of the short side of the Al laminate film, and after the injection, they were allowed to stand for 5 minutes under a reduced pressure of 0.06 MPa to impregnate the electrode mixture layers with the non-aqueous liquid electrolyte. Lastly, the end face of the injected side of the Al laminate film was heat sealed at 230° C., thereby producing evaluation cells A1 to A12 of Examples 1 to 12, evaluation cells R1 to R2 of Reference Examples 1 to 2, and evaluation cells B1 to B4 of Comparative Examples 1 to 4. The evaluation cell was prepared in a dry air atmosphere having a dew point of −50° C. or less.

(5) Battery Evaluation

The evaluation cell was sandwiched by a pair of 80×80 cm stainless steel (thickness 2 mm) clamps to be pressurized and fixed at 0.2 MPa.

First, a set of charging and discharging was repeated for 5 cycles in a thermostatic chamber of 25° C. with a constant current of 0.05 C (1 C being an electric current value at which the designed capacity is discharged by 1 hour). Charging was terminated at a battery voltage of 4.2 V, and discharging was terminated at a battery voltage of 2.5 V, respectively, and the batteries were allowed to stand for 20 minutes with an open circuit between the charging and discharging.

(6) Evaluation

The non-aqueous electrolyte secondary batteries produced in Examples, Reference Examples, and Comparative Examples were evaluated as below. In a 25° C. temperature environment, the battery was subjected to constant current charging at a current of 0.3 It until the voltage reached 4.1 V, and thereafter, subjected to constant voltage charging at a constant voltage of 4.1 V until the electric current reached 0.05 It. Then, the battery was stored in a 25° C. temperature environment, and then the voltage reduction amount after 100 hours was determined. When the voltage reduction amount was 20 mV or more, it can be judged that the metal dissolution reaction and deposition reaction occurred. Table 1 shows the results.

TABLE 1

| Cell | Positive Electrode Active Material | Metal Powder | RS Content (wt %) | Voltage Reduction (mV) |
|---|---|---|---|---|
| A1 | LNCM | Cu | 0.01 | 9 |
| A2 | LNCM | Cu | 1.00 | 9 |
| A3 | LNCM | Cu | 5.00 | 6 |
| A4 | LNCM | Fe | 0.01 | 11 |
| A5 | LNCM | Fe | 1.00 | 9 |
| A6 | LNCM | Fe | 5.00 | 7 |
| A7 | LNCA | Cu | 0.01 | 5 |
| A8 | LNCA | Cu | 1.00 | 6 |
| A9 | LNCA | Cu | 5.00 | 2 |
| A10 | LNCA | Fe | 0.01 | 6 |
| A11 | LNCA | Fe | 1.00 | 7 |
| A12 | LNCA | Fe | 5.00 | 7 |
| R1 | LNCM | — | — | 7 |
| B1 | LNCM | Cu | — | 3102 |
| B2 | LNCM | Fe | — | 342 |
| R2 | LNCA | — | — | 5 |
| B3 | LNCA | Cu | — | 3009 |
| B4 | LNCA | Fe | — | 2209 |

As is shown with the cells B1 to B4 of Comparative Examples 1 to 4, generally, when impurity metals are mixed into the batteries, the voltage reduction occurs based on the already stated mechanism. Meanwhile, with the cells A1 to A12 of Examples 1 to 12, in which the triazine dithiol derivative RS is included in the non-aqueous liquid electrolyte, almost no voltage reduction occurred, and effects from the impurity metal are greatly reduced. Furthermore, the triazine dithiol derivative RS content in the non-aqueous liquid electrolyte of 0.01 mass % was sufficient, and no great change can be seen until at least 5 mass %. The voltage reduction of the cells A1 to A12 of Examples 1 to 12 is about the same level as those of the cells R1 to R2 of Reference Examples 1 to 2 including no metal powder.

A slight voltage reduction can be seen in the cells R1 to R2 of Reference Examples 1 to 2. However, the cells R1 to R2 of Reference Examples 1 to 2 contained no triazine dithiol derivative RS. When a normal battery with no impurity contamination contains the triazine dithiol derivative RS, the voltage reduction can further be suppressed more than the cells R1 to R2 of Reference Examples 1 to 2.

INDUSTRIAL APPLICABILITY

The non-aqueous electrolyte secondary battery of the present disclosure is suitable for a main power source for mobile communication devices and mobile electronic devices, and a power source for vehicles, but applications are not limited thereto.

REFERENCE SIGNS LIST

1 Electrode Group
2 Positive Electrode Lead
3 Negative Electrode Lead
4 Battery Case
5 Sealing Plate
6 Negative Electrode Terminal
7 Gasket
8 Sealing Plug

The invention claimed is:

1. A non-aqueous electrolyte secondary battery comprising: a positive electrode including a positive electrode active material, a separator, a negative electrode facing the positive electrode with the separator interposed therebetween, and a non-aqueous liquid electrolyte,
  wherein the non-aqueous liquid electrolyte includes a non-aqueous solvent, and 6-alkylthio-1,3,5-triazine-2,4-dithiol represented by a general formula:

[Chemical formula 2]

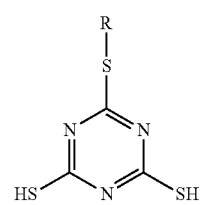

wherein R is an alkyl group, and at least a portion of the 6-alkylthio-1,3,5-triazine-2,4-dithiol is dissolved in the non-aqueous solvent,
  wherein the alkylthio group at a 6th position has an alkyl group with 1 to 8 carbon atoms,
  wherein the 6-alkylthio-1,3,5-triazine-2,4-dithiol content in the non-aqueous liquid electrolyte is 0.01 mass % or more and 5 mass % or less,
  wherein the positive electrode active material includes a lithium transition metal composite oxide having a layered rock salt type structure, and including Ni, Co, and at least one selected from the group consisting of Al and Mn, and
  wherein the positive electrode further includes a metal powder impurity of at least one selected from the group consisting of Cu and Fe.

2. The non-aqueous liquid electrolyte for a non-aqueous electrolyte secondary battery of claim 1, wherein the non-aqueous liquid electrolyte includes vinylene carbonate.

3. The non-aqueous liquid electrolyte for a non-aqueous electrolyte secondary battery of claim 1, wherein the non-aqueous liquid electrolyte includes an oxalate complex salt.

\* \* \* \* \*